(12) United States Patent
Liao et al.

(10) Patent No.: US 12,553,489 B2
(45) Date of Patent: Feb. 17, 2026

(54) SEISMIC EVENT DISPLACEMENT MITIGATION

(71) Applicant: Taiwan Semiconductor Manufacturing Company Limited, Hsin-Chu (TW)

(72) Inventors: Chen Hao Liao, Hsinchu (TW); Chih-Tsung Lee, Hsinchu (TW); Ming-Yi Lin, Hsinchu (TW); Cheng-Lung Wu, Miaoli County (TW); Jiun-Rong Pai, Jhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 9 days.

(21) Appl. No.: 18/411,704

(22) Filed: Jan. 12, 2024

(65) Prior Publication Data
US 2025/0230851 A1 Jul. 17, 2025

(51) Int. Cl.
*F16F 7/10* (2006.01)
*F16F 7/06* (2006.01)

(52) U.S. Cl.
CPC .............. *F16F 7/1022* (2013.01); *F16F 7/06* (2013.01)

(58) Field of Classification Search
CPC .. F16F 7/1022; F16F 7/06; F16F 15/12; F16F 15/131; F16F 15/30; F16F 15/31; F16F 15/315; F16F 15/3153; F16F 15/3156
See application file for complete search history.

(56) References Cited

U.S. PATENT DOCUMENTS

| | | | | |
|---|---|---|---|---|
| 6,123,313 A * | 9/2000 | Otsuka | ..................... | E04H 9/023 248/580 |
| 6,164,022 A * | 12/2000 | Ishikawa | .................. | B23Q 1/48 52/167.4 |
| 6,367,390 B1 * | 4/2002 | Okubo | ....................... | B66C 9/12 212/253 |
| 7,237,364 B2 * | 7/2007 | Tsai | ........................ | F16F 15/02 52/167.6 |
| 7,472,518 B2 * | 1/2009 | Tsai | ........................ | E04H 9/023 52/167.6 |
| 10,711,859 B2 * | 7/2020 | Mitsch | ................... | F16F 7/1022 |
| 11,821,234 B2 * | 11/2023 | Hsu | ......................... | E04H 9/023 |
| 12,209,632 B2 * | 1/2025 | De Laet | .............. | F16F 15/1435 |
| 12,234,877 B2 * | 2/2025 | Sawatsky | ................ | B22F 12/38 |
| 12,241,275 B2 * | 3/2025 | Yu | ........................... | E04H 9/023 |
| 2003/0196501 A1 * | 10/2003 | Doornbos | ................. | F16F 7/00 74/411 |
| 2004/0252287 A1 * | 12/2004 | Binnard | .............. | G03F 7/70716 355/75 |
| 2006/0048462 A1 * | 3/2006 | Huang | .................... | E04H 9/023 52/167.5 |

(Continued)

*Primary Examiner* — Eret C Mcnichols
(74) *Attorney, Agent, or Firm* — Cooper Legal Group, LLC

(57) ABSTRACT

An apparatus is provided. The apparatus includes an equipment support structure configured to support a semiconductor fabrication component. The apparatus includes a damper assembly configured to resist a lateral force induced by a seismic event to the equipment support structure. The damper assembly includes a gear rack coupled to the equipment support structure. The damper assembly includes a first flywheel assembly including a first mass damper flywheel and a first gear meshed with the gear rack and selectively engaged with the first mass damper flywheel.

20 Claims, 8 Drawing Sheets

(56) References Cited

U.S. PATENT DOCUMENTS

| | | | |
|---|---|---|---|
| 2019/0284800 A1* | 9/2019 | Cynober | E04H 9/0215 |
| 2022/0251863 A1* | 8/2022 | Hsu | E04H 9/023 |
| 2023/0279917 A1* | 9/2023 | Seeley | F16F 7/1022 |
| | | | 188/380 |

* cited by examiner

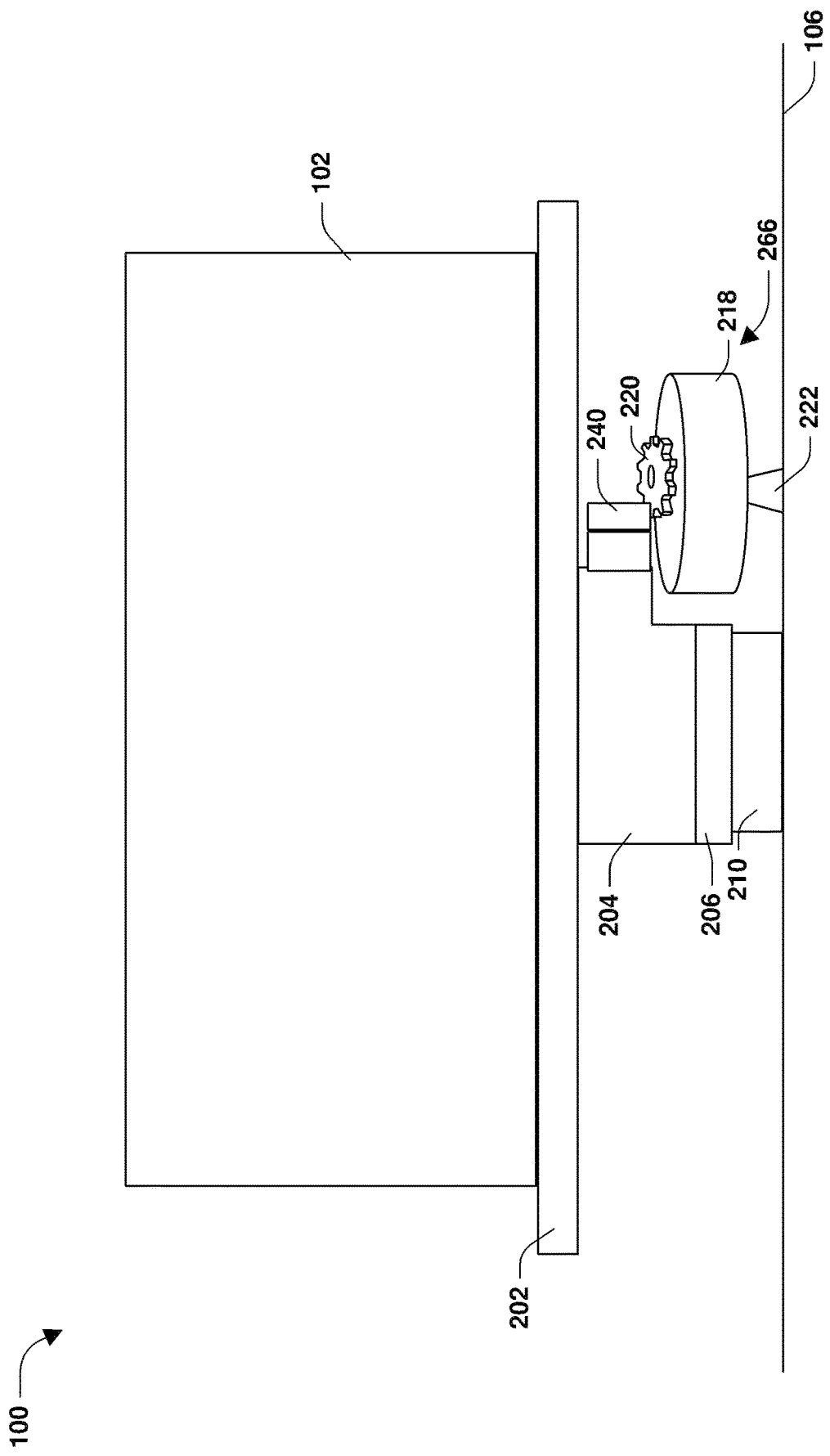

SEISMIC EVENT DISPLACEMENT MITIGATION

BACKGROUND

When a seismic event such as an earthquake occurs, a building in an area of the seismic event is subjected to seismic energy, which can cause objects in the building to be moved in an uncontrollable manner and/or to collide with each other.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2B illustrates a side view of an apparatus and a component, in accordance with some embodiments.

DETAILED DESCRIPTION

Figure 1:
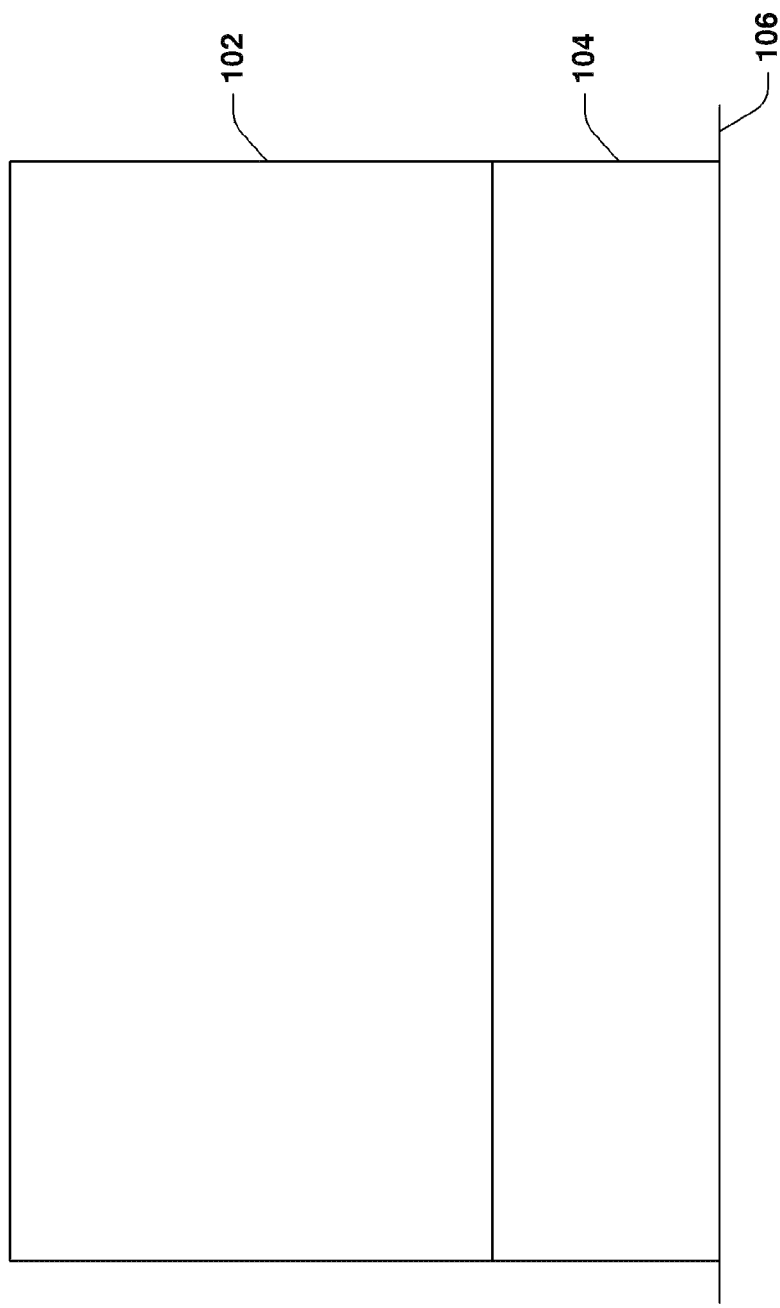
FIG. 1 illustrates a front view of an apparatus and a component, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

The term "overlying" and/or the like may be used to describe one element or feature being vertically coincident with and at a higher elevation than another element or feature. For example, a first element overlies a second element if the first element is at a higher elevation than the second element and at least a portion of the first element is vertically coincident with at least a portion of the second element.

The term "underlying" and/or the like may be used to describe one element or feature being vertically coincident with and at a lower elevation than another element or feature. For example, a first element underlies a second element if the first element is at a lower elevation than the second element and at least a portion of the first element is vertically coincident with at least a portion of the second element.

The term "over" may be used to describe one element or feature being at a higher elevation than another element or feature. For example, a first element is over a second element if the first element is at a higher elevation than the second element.

The term "under" may be used to describe one element or feature being at a lower elevation than another element or feature. For example, a first element is under a second element if the first element is at a lower elevation than the second element.

According to some embodiments, an apparatus is used to mitigate lateral displacement of a component during a seismic event, such as an earthquake. In some embodiments, the apparatus includes an equipment support structure configured to support the component. In some embodiments, the apparatus includes a first damper assembly configured to convert a lateral force induced by the seismic event to a vertical movement of at least one of the equipment support structure or the component. In some embodiments, the first damper assembly includes a base plate underlying the equipment support structure and one or more damper bodies between the base plate and the equipment support structure. In some embodiments, the one or more damper bodies are in contact with a first surface of the base plate. In some embodiments, the first surface of the base plate is curved such that interaction between the one or more damper bodies with the first surface of the base plate translates the lateral force induced by the seismic event to the vertical movement of the equipment support structure. In some embodiments, during the seismic event, the one or more damper bodies travel in an inclined path of motion along the first surface of the base plate, thereby providing for increasing friction along the inclined path of motion. In some embodiments, the increasing friction along the inclined path of motion provides increased resistance to and/or increased absorption of seismic energy of the seismic event. Thus, in accordance with some embodiments, in comparison with a system that does not comprise the base plate with the first (curved) surface, the base plate with the first (curved) surface provides for at least one of reduced displacement, such as reduced lateral displacement, of the component during the seismic event, reduced vibration of the component during the seismic event, improved control over displacement of the component during the seismic event, increased stability of the component during the seismic event, or reduced damage to the component by the seismic event. In some embodiments, the reduced lateral displacement of the component provides for a reduced likelihood that the component collides with an object, such as equipment in the same building as the component.

In some embodiments, the apparatus includes a second damper assembly configured to resist a lateral force induced by the seismic event to at least one of the equipment support structure or the component. In some embodiments, the second damper assembly includes a flywheel assembly and a gear rack. In some embodiments, the gear rack is coupled to the equipment support structure. In some embodiments, the flywheel assembly comprises a mass damper flywheel and a gear meshed with the gear rack. In some embodiments, the gear is selectively engaged with the first mass damper flywheel. In some embodiments, when the gear is engaged with the first mass damper flywheel, the mass damper flywheel absorbs at least some of the lateral force induced by the seismic event. Thus, in accordance with some embodiments, in comparison with a system that does not include the mass damper flywheel, the apparatus comprising the mass damper flywheel provides for at least one of reduced displacement of the component during the seismic event, reduced vibration of the component during the seismic event, improved control over displacement of the component during the seismic event, increased stability of the component during the seismic event, or reduced damage to the component by the seismic event.

In some embodiments, the component comprises a semiconductor fabrication component. In some embodiments, the component is used to process one or more wafers. In some embodiments, the apparatus of the present disclosure at least one of mitigates or prevents damage and/or particle defects by the seismic event to the one or more wafers.

FIGS. 1-6 illustrates aspects associated with a system 100, according to some embodiments. In some embodiments, the system 100 comprises a component 102 and a damper apparatus 104 configured to mitigate displacement of the component 102 during a seismic event, such as an earthquake. FIG. 1 illustrates a front view of the component 102 and the damper apparatus 104, according to some embodiments. In some embodiments, the damper apparatus 104 at least one of underlies or is in contact with the component 102. In some embodiments, the component 102 comprises a semiconductor fabrication component. In some embodiments, the semiconductor fabrication component comprises at least one of (i) a furnace, such as a semiconductor furnace tool, (ii) physical vapor deposition (PVD) equipment, (iii) plating equipment, (iv) etching equipment, such as at least one of plasma etching equipment, wet etching equipment, dry etching equipment, reactive-ion etching (RIE) equipment, atomic layer etching (ALE) equipment, buffered oxide etching equipment, or ion beam milling equipment, (v) lithography equipment, (vi) chemical mechanical planarization (CMP) equipment, (vii) chemical vapor deposition (CVD) equipment, or (viii) other equipment. In some embodiments, the damper apparatus 104 is configured to at least one of (i) absorb, such as consume, seismic energy of the seismic event, such as seismic energy of a seismic wave of the seismic event, or (ii) convert a lateral force induced by the seismic event to vertical movement of the component 102.

In some embodiments, the damper apparatus 104 resides on a surface 106. In some embodiments, the surface 106 is a surface, such as a top surface, of at least one of (i) flooring of a building (not shown) in which the damper apparatus 104 and the component 102 are disposed, (ii) a foundation (not shown) of the building, wherein the foundation at least one of overlies or is in contact with the ground, (iii) a structure (not shown) of the building, wherein the structure at least one of overlies or is in contact with the ground, (iv) the ground, or (v) other structure and/or object.

Figure 2A:
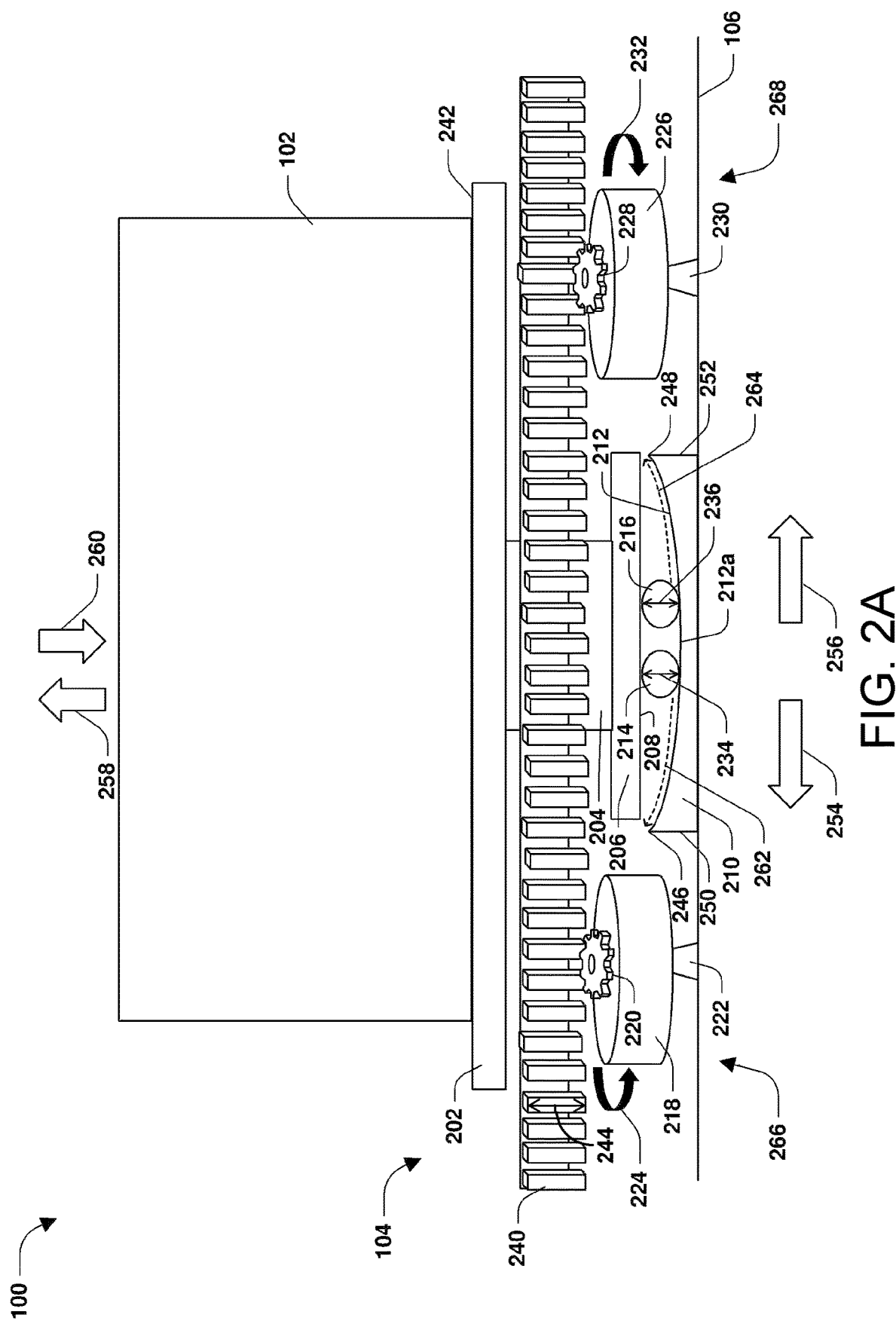
FIG. 2A illustrates a front view of an apparatus and a component, in accordance with some embodiments.

FIG. 2A illustrates a front view of the damper apparatus 104 and the component 102, according to some embodiments. FIG. 2B illustrates a side view of the damper apparatus 104 and the component 102, according to some embodiments. In some embodiments, the damper apparatus 104 comprises an equipment support structure configured to support the component 102. In some embodiments, the equipment support structure comprises at least one of a first plate 202, a second plate 206 underlying the first plate 202, or a body 204 between the first plate and the second plate 206. In some embodiments, the component 102 rests upon a top surface 242 of the first plate 202. In some embodiments, at least one of the first plate 202 or the second plate 206 is attached to the body 204. It will be appreciated that, as used herein, by being attached, the first plate 202, the second plate 206, and the body 204 are not limited to comprising three separate structures that are attached. Rather, in some embodiments, at least two of the first plate 202, the body 204, or the second plate 206 are integrally formed, one piece formed, a single composite piece, etc. In some embodiments, the equipment support structure comprises two or three or more separate structures that are attached, such as with mechanical fasteners, welding, adhesives, etc.

In some embodiments, the damper apparatus 104 comprises a first damper assembly configured to convert the lateral force induced by the seismic event to vertical movement of at least one of the equipment support structure or the component 102. In some embodiments, the first damper assembly comprises at least one of a base plate 210, a first damper body 214, or a second damper body 216. In some embodiments, the base plate 210 underlies the equipment support structure. In some embodiments, at least one of the first damper body 214 or the second damper body 216 is between the base plate 210 and the equipment support structure. In some embodiments, the second plate 206 is at least one of in contact with or rests upon at least one of the first damper body 214 or the second damper body 216. Although two damper bodies are shown in FIG. 2A, embodiments are contemplated in which the damper apparatus 104 comprises any quantity of damper bodies between the base plate 210 and the equipment support structure.

In some embodiments, at least one of the first damper body 214 or the second damper body 216 is in contact with a first surface 212 of the base plate 210. In some embodiments, the first surface 212 of the base plate 210 is curved. In some embodiments, the first surface 212 of the base plate 210 at least one of is treated or comprises a buffer layer to establish at least a threshold amount of friction between the first surface 212 and at least one of the first damper body 214 or the second damper body 216. In some embodiments, the buffer layer comprises at least one of a polymer, such as rubber, or other suitable material. In some embodiments, the first surface 212 of the first damper body 214 extends from a first edge 246 of the base plate 210 to a second edge 248 of the base plate 210. In some embodiments, the first edge 246 corresponds to an edge between the first surface 212 and a first sidewall 250 of the base plate 210. In some embodiments, the second edge 248 corresponds to an edge between the first surface 212 and a second sidewall 252 of the base plate 210. In some embodiments, (i) the first edge 246 has a first elevation relative to the surface 106, (ii) the second edge 248 has a second elevation relative to the surface 106, and (iii) a portion 212a, of the first surface 212, between the first edge 246 and the second edge 248 has a third elevation relative to the surface 106. In some embodiments, the first elevation of the first edge 246 and the second elevation of the second edge 248 are greater than the third elevation of the portion 212a of the first surface 212. The first elevation of the first edge 246 is about equal to the second elevation of the second edge 248. Embodiments are contemplated in which the first elevation of the first edge 246 is different than the second elevation of the second edge 248. In some embodiments, at least one of the first damper body 214 or the second damper body 216 is in contact with a surface 208 of the equipment support structure. In some embodiments, the surface 208 of the equipment support structure comprises a bottom surface of the second plate 206.

In some embodiments, at least one of the first damper body 214 has a first circular cross-section or the second damper body 216 has a second circular cross-section. In some embodiments, the first damper body 214 comprises a first cylindrical object. In some embodiments, the first damper body 214 comprises a second cylindrical object. Other shapes of the first damper body 214 and/or the second damper body 216 are within the scope of the present disclosure.

Embodiments are contemplated in which at least one of the first damper body 214 has a first elliptical cross-section or the second damper body 216 has a second elliptical cross-section.

A first damper body diameter 234 of the first damper body 214 is at least about 10 millimeters. A second damper body diameter 236 of the second damper body 216 is at least about 10 millimeters. Other values of the first damper body diameter 234 and the second damper body diameter 236 are within the scope of the present disclosure. The first damper body diameter 234 is about equal to the second damper body diameter 236. Embodiments are contemplated in which the first damper body diameter 234 is different than the second damper body diameter 236.

In some embodiments, the first damper body 214 comprises at least one of a first metal or other suitable material. In some embodiments, the first metal comprises steel, such as stainless steel, or other suitable metal. In some embodiments, the second damper body 216 comprises at least one of a second metal or other suitable material. In some embodiments, the second metal comprises steel, such as stainless steel, or other suitable metal. In some embodiments, the damper apparatus 104 comprises a spacer (not shown) between the first damper body 214 and the second damper body 216. In some embodiments, the spacer maintains a space between the first damper body 214 and the second damper body 216 such that the first damper body 214 and the second damper body 216 are not touching.

Figure 3A:
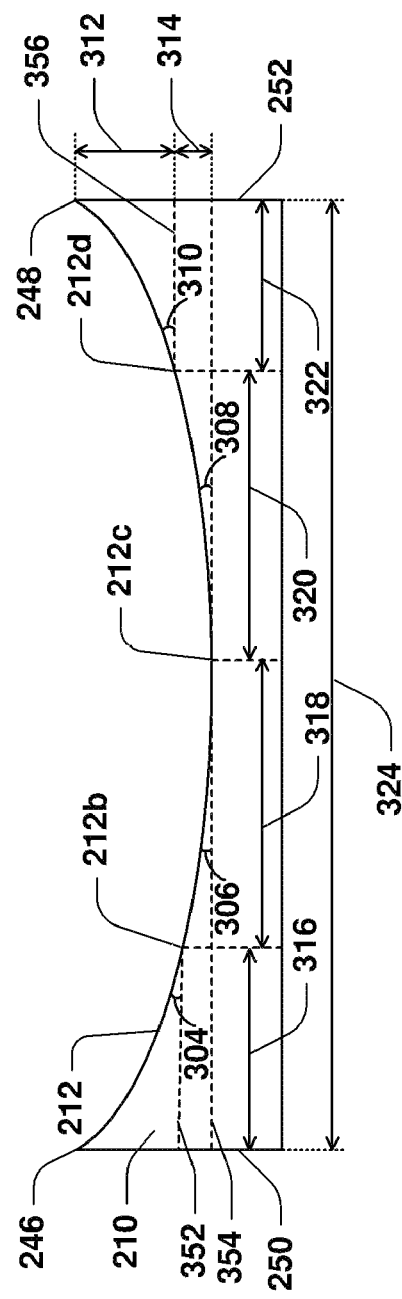
FIG. 3A illustrates an enlarged front view of a base plate of an apparatus, in accordance with some embodiments.
Figure 3B:
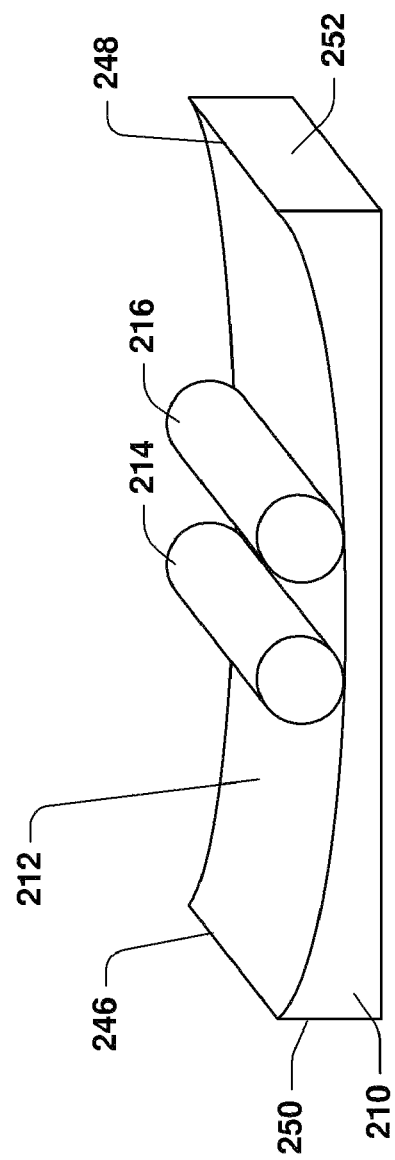
FIG. 3B illustrates a perspective view of a base plate, a first damper body, and a second damper body of an apparatus, in accordance with some embodiments.

FIGS. 3A-3B illustrate aspects associated with at least one of the base plate 210, the first damper body 214, or the second damper body 216. FIG. 3A illustrates an enlarged front view of the base plate 210, according to some embodiments. In some embodiments, the base plate 210 has dimensions comprising at least one of a first length 312, a second length 314, a third length 316, a fourth length 318, a fifth length 320, a sixth length 322, a seventh length 324, a first curvature angle 304, a second curvature angle 306, a third curvature angle 308, or a fourth curvature angle 310.

In some embodiments, the first length 312 corresponds to a distance between an elevation of the second edge 248 of the base plate 210 and an elevation of a portion 212d of the first surface 212 of the base plate 210. In some embodiments, the second length 314 corresponds to a distance between the elevation of the portion 212d of the first surface 212 of the base plate 210 and an elevation of a portion 212c of the first surface 212 of the base plate 210. In some embodiments, the portion 212c of the first surface 212 of the base plate 210 comprises a middle portion of the first surface 212. In some embodiments, the portion 212c of the first surface 212 of the base plate 210 is about equidistant from the first edge 246 of the base plate 210 and the second edge 248 of the base plate 210. A sum of the first length 312 and the second length 314 is at least about three millimeters. Other values of the sum of the first length 312 and the second length 314 are within the scope of the present disclosure. In some embodiments, the first length 312 is greater than the second length 314.

In some embodiments, the third length 316 corresponds to a distance between a lateral position of the first edge 246 of the base plate 210 and a lateral position of a portion 212b of the first surface 212 of the base plate 210. In some embodiments, the fourth length 318 corresponds to a distance between the lateral position of the portion 212b of the first surface 212 of the base plate 210 and a lateral position of the portion 212c of the first surface 212 of the base plate 210. In some embodiments, the fifth length 320 corresponds to a distance between the lateral position of the portion 212c of the first surface 212 of the base plate 210 and a lateral position of the portion 212d of the first surface 212 of the base plate 210. In some embodiments, the sixth length 322 corresponds to a distance between the lateral position of the portion 212d of the first surface 212 of the base plate 210 and a lateral position of the second edge 248 of the base plate 210. In some embodiments, the seventh length 324 corresponds to a distance between the first sidewall 250 and the second sidewall 252 of the base plate 210.

The third length 316 is about equal to the sixth length 322. Embodiments are contemplated in which the third length 316 is different than the sixth length 322. In some embodiments, at least one of the third length 316 or the sixth length 322 is about equal to a value J. The fourth length 318 is about equal to the fifth length 320. Embodiments are contemplated in which the fourth length 318 is different than the fifth length 320. In some embodiments, at least one of the fourth length 318 or the fifth length 320 is about equal to a value K. In some embodiments, the seventh length 324 is about equal to a value G. In some embodiments, $G=2K+2J$. In some embodiments, $K>J$. In some embodiments, the value J is greater than the first length 312. In some embodiments, a curvature associated with the value J is at least 2n, wherein the value n is at least 1. In some embodiments, the value n is an integer. In some embodiments, a curvature associated with the value K is at least 2n, wherein the value n is at least 1.

In some embodiments, the first curvature angle 304 corresponds to an angle of curvature of the portion 212b of the first surface 212 relative to a horizontal line intersecting with the portion 212b, such as dashed line 352 in FIG. 3A. In some embodiments, the second curvature angle 306 corresponds to a first angle of curvature of the portion 212c of the first surface 212 relative to a horizontal line intersecting with the portion 212c, such as dashed line 354 in FIG. 3A. In some embodiments, the third curvature angle 308 corresponds to a second angle of curvature of the portion 212c of the first surface 212 relative to the horizontal line intersecting with the portion 212c, such as the dashed line 354 in FIG. 3A. In some embodiments, the fourth curvature angle 310 corresponds to an angle of curvature of the portion 212d of the first surface 212 relative to a horizontal line intersecting with the portion 212d, such as dashed line 356 in FIG. 3A.

The first curvature angle 304 is between about 5 degrees and about 10 degrees. The fourth curvature angle 310 is between about 5 degrees and about 10 degrees. Other values of the first curvature angle 304 and the fourth curvature angle 310 are within the scope of the present disclosure. The first curvature angle 304 is about equal to the fourth curvature angle 310. Embodiments are contemplated in which the first curvature angle 304 is different than the fourth curvature angle 310.

The second curvature angle 306 is between about 0 degrees and about 5 degrees. The third curvature angle 308 is between about 0 degrees and about 5 degrees. Other values of the second curvature angle 306 and the third curvature angle 308 are within the scope of the present disclosure. The second curvature angle 306 is about equal to the third curvature angle 308. Embodiments are contemplated in which the first curvature angle 304 is different than the third curvature angle 308.

FIG. 3B illustrates a perspective view of the base plate 210, the first damper body 214, and the second damper body 216, according to some embodiments.

In some embodiments, interaction between the first damper body 214 and the second damper body 216 with the first surface 212 of the base plate 210 translates a lateral force induced by the seismic event to vertical movement of at least one of the equipment support structure or the component 102. In some embodiments, the lateral force is imparted by the seismic event to at least one of the equipment support structure or the component 102. In some embodiments, the lateral force is converted to the vertical movement of at least one of the equipment support structure or the component 102 due to the first surface 212 of the base plate 210 being curved and/or having one or more of the dimensions provided herein. In some embodiments, the lateral force is in a first direction 254, such as a first lateral direction. In some embodiments, the lateral force is in a second direction 256, such as a second lateral direction opposite the first lateral direction. In some embodiments, the vertical movement comprises movement in at least one of a third direction 258, such as a first vertical direction, or a fourth direction 260, such as a second vertical direction opposite the first vertical direction.

In some embodiments, when the lateral force of the seismic event is in the first direction 254, at least one of the first damper body 214 or the second damper body 216 moves along a first path of motion 262. In some embodiments, the first path of motion 262 is inclined according to a curvature of the first surface 212 of the base plate 210 such that the movement of at least one of the first damper body 214 or the second damper body 216 along the first path of motion 262 displaces the equipment support structure in the third direction 258. In some embodiments, a friction between the first surface 212 of the base plate 210 and at least one of the first damper body 214 or the second damper body 216 increases along the first path of motion 262, such as due, at least in part, to the first path of motion 262 being inclined. In some embodiments, the increasing friction provides increased resistance to and/or increased absorption of seismic energy of the seismic event.

In some embodiments, when the lateral force of the seismic event is in the second direction 256, at least one of the first damper body 214 or the second damper body 216 moves along a second path of motion 264. In some embodiments, the second path of motion 264 is inclined according to a curvature of the first surface 212 of the base plate 210 such that the movement of at least one of the first damper body 214 or the second damper body 216 along the second path of motion 264 displaces the equipment support structure in the third direction 258. In some embodiments, a friction between the first surface 212 of the base plate 210 and at least one of the first damper body 214 or the second damper body 216 increases along the second path of motion 264, such as due, at least in part, to the second path of motion 264 being inclined. In some embodiments, the increasing friction provides increased resistance to and/or increased absorption of seismic energy of the seismic event.

In some embodiments, the damper apparatus 104 comprises a second damper assembly configured to resist a lateral force induced by the seismic event to at least one of the equipment support structure or the component 102. In some embodiments, the second damper assembly comprises at least one of a gear rack 240, a first flywheel assembly 266, or a second flywheel assembly 268. In some embodiments, the gear rack 240 is coupled to the equipment support structure. For example, in accordance with some embodiments, the gear rack 240 is attached to the body 204 of the equipment support structure. In some embodiments, the second damper assembly uses at least one of the first flywheel assembly 266 or the second flywheel assembly 268 to absorb seismic energy of the seismic event.

In some embodiments, the first flywheel assembly 266 comprises at least one of a first gear 220, a first mass damper flywheel 218, or a first one-way bearing 222. In some embodiments, the first gear 220 is meshed with the gear rack 240. In some embodiments, the first gear 220 and the gear rack 240 have a first rack and pinion configuration. In some embodiments, the first gear 220 is selectively engaged with the first mass damper flywheel 218. In some embodiments, the first gear 220 is engaged with the first mass damper flywheel 218 when a lateral force induced by the seismic event is in the first direction 254. In some embodiments, when the first gear 220 is engaged with the first mass damper flywheel 218 and the seismic event imparts the lateral force in the first direction 254 to at least one of the component 102, the equipment support structure, or the gear rack 240 coupled to the equipment support structure, the first mass damper flywheel 218 absorbs at least some of the lateral force to mitigate lateral displacement of at least one of the component 102, the equipment support structure, or the gear rack 240 in the first direction 254.

In some embodiments, the first gear 220 is disengaged from the first mass damper flywheel 218 when the lateral force induced by the seismic event is in the second direction 256. In some embodiments, the first one-way bearing 222 is configured to facilitate engagement and disengagement of the first gear 220 with the first mass damper flywheel 218. In some embodiments, the first one-way bearing 222 facilitates engagement of the first gear 220 with the first mass damper flywheel 218 when the lateral force induced by the seismic event is in the first direction 254. In some embodiments, the first one-way bearing 222 facilitates disengagement of the first gear 220 from the first mass damper flywheel 218 when the lateral force induced by the seismic event is in the second direction 256.

Although two flywheel assemblies are shown in FIG. 2A, embodiments are contemplated in which the damper apparatus 104 comprises any quantity of flywheel assemblies configured to absorb seismic energy of the seismic event. In some embodiments, the quantity of flywheel assemblies of the damper apparatus 104 is a multiple of two.

In some embodiments, the lateral force in the first direction 254 causes displacement of the gear rack 240 in the first direction 254. In some embodiments, the displacement of the gear rack 240 in the first direction 254 drives the first gear 220 to rotate in a first rotational direction 224, such as due, at least in part, to the first gear 220 being meshed with the gear rack 240. In some embodiments, the first one-way bearing 222 allows movement of the first mass damper flywheel 218 in the first rotational direction 224, such as due, at least in part, to the first one-way bearing 222 facilitating engagement of the first gear 220 with the first mass damper flywheel 218 when the lateral force of the seismic event is in the first direction 254. Thus, in accordance with some embodiments, when the seismic event imparts the lateral force in the first direction 254, the first mass damper flywheel 218 of the first flywheel assembly 266 actively resists lateral displacement of at least one of the component 102, the equipment support structure, or the gear rack 240 in the first direction 254, such as due, at least in part, to the first one-way bearing 222 facilitating engagement of the first gear 220 with the first mass damper flywheel 218 and the first gear 220 being meshed with the gear rack 240. In some embodiments, the first direction 254 is tangential to the first rotational direction 224.

In some embodiments, the lateral force in the second direction 256 causes displacement of the gear rack 240 in the second direction 256. In some embodiments, the displacement of the gear rack 240 in the second direction 256 drives the first gear 220 to rotate in a second rotational direction 232, such as due, at least in part, to the first gear 220 being meshed with the gear rack 240. In some embodiments, the second rotational direction 232 is opposite the first rotational direction 224. In some embodiments, the first one-way bearing 222 at least one of blocks or does not facilitate movement of the first mass damper flywheel 218 in the second rotational direction 232, such as due, at least in part, to the first one-way bearing 222 facilitating disengagement of the first gear 220 from the first mass damper flywheel 218 when the lateral force of the seismic event is in the second direction 256. Thus, in accordance with some embodiments, when the seismic event imparts the lateral force in the second direction 256, the first mass damper flywheel 218 is at least one of inactive or does not actively resist lateral displacement of at least one of the component 102, the equipment support structure, or the gear rack 240 in the second direction 256. In some embodiments, the second direction 256 is tangential to the second rotational direction 232.

In some embodiments, the second flywheel assembly 268 comprises at least one of a second gear 228, a second mass damper flywheel 226, or a second one-way bearing 230. In some embodiments, the second gear 228 is meshed with the gear rack 240. In some embodiments, the second gear 228 and the gear rack 240 have a second rack and pinion configuration. In some embodiments, the second gear 228 is selectively engaged with the second mass damper flywheel 226. In some embodiments, the second gear 228 is engaged with the second mass damper flywheel 226 when the lateral force induced by the seismic event is in the second direction 256. In some embodiments, when the second gear 228 is engaged with the second mass damper flywheel 226 and the seismic event imparts the lateral force in the second direction 256 to at least one of the component 102, the equipment support structure, or the gear rack 240 coupled to the equipment support structure, the second mass damper flywheel 226 absorbs at least some of the lateral force to mitigate lateral displacement of at least one of the component 102, the equipment support structure, or the gear rack 240 in the second direction 256.

In some embodiments, the second gear 228 is disengaged from the second mass damper flywheel 226 when the lateral force induced by the seismic event is in the first direction 254. In some embodiments, the second one-way bearing 230 is configured to facilitate engagement and disengagement of the second gear 228 with the second mass damper flywheel 226. In some embodiments, the second one-way bearing 230 facilitates engagement of the second gear 228 with the second mass damper flywheel 226 when the lateral force induced by the seismic event is in the second direction 256. In some embodiments, the second one-way bearing 230 facilitates disengagement of the second gear 228 from the second mass damper flywheel 226 when the lateral force induced by the seismic event is in the first direction 254.

In some embodiments, the lateral force in the second direction 256 causes displacement of the gear rack 240 in the second direction 256. In some embodiments, the displacement of the gear rack 240 in the second direction 256 drives the second gear 228 to rotate in the second rotational direction 232, such as due, at least in part, to the second gear 228 being meshed with the gear rack 240. In some embodiments, the second one-way bearing 230 allows movement of the second mass damper flywheel 226 in the second rotational direction 232, such as due, at least in part, to the second one-way bearing 230 facilitating engagement of the second gear 228 with the second mass damper flywheel 226 when the lateral force of the seismic event is in the second direction 256. Thus, in accordance with some embodiments, when the seismic event imparts the lateral force in the second direction 256, the second mass damper flywheel 226 of the second flywheel assembly 268 actively resists lateral displacement of at least one of the component 102, the equipment support structure, or the gear rack 240 in the second direction 256, such as due, at least in part, to the second one-way bearing 230 facilitating engagement of the second gear 228 with the second mass damper flywheel 226 and the second gear 228 being meshed with the gear rack 240.

In some embodiments, the lateral force in the first direction 254 causes displacement of the gear rack 240 in the first direction 254. In some embodiments, the displacement of the gear rack 240 in the first direction 254 drives the second gear 228 to rotate in the first rotational direction 224, such as due, at least in part, to the second gear 228 being meshed with the gear rack 240. In some embodiments, the second one-way bearing 230 at least one of blocks or does not facilitate movement of the second mass damper flywheel 226 in the first rotational direction 224 such as due, at least in part, to the second one-way bearing 230 facilitating disengagement of the second gear 228 from the second mass damper flywheel 226 when the lateral force of the seismic event is in the first direction 254. Thus, in accordance with some embodiments, when the seismic event imparts the lateral force in the first direction 254, the second mass damper flywheel 226 is at least one of inactive or does not actively resist lateral displacement of at least one of the component 102, the equipment support structure, or the gear rack 240 in the first direction 254.

Thus, in accordance with some embodiments, when the seismic event imparts a lateral force in the first direction 254, the second damper assembly is in a first seismic energy absorption state in which at least one of (i) the first mass damper flywheel 218 of the first flywheel assembly 266 absorbs seismic energy of the seismic event to actively resist lateral displacement of at least one of the component 102, the equipment support structure, or the gear rack 240 in the first direction 254, or (ii) the second mass damper flywheel 226 of the second flywheel assembly 268 is inactive, such as due, at least in part, to the second one-way bearing 230 facilitating disengagement of the second gear 228 from the second mass damper flywheel 226.

In accordance with some embodiments, when the seismic event imparts a lateral force in the second direction 256, the second damper assembly is in a second seismic energy absorption state in which at least one of (i) the first mass damper flywheel 218 of the first flywheel assembly 266 is inactive, such as due, at least in part, to the first one-way bearing 222 facilitating disengagement of the first gear 220 from the first mass damper flywheel 218, or (ii) the second mass damper flywheel 226 of the second flywheel assembly 268 absorbs seismic energy of the seismic event to actively resist lateral displacement of at least one of the component 102, the equipment support structure, or the gear rack 240 in the second direction 256.

In some embodiments, during the seismic event, the second damper assembly switches between the first seismic energy absorption state and the second seismic energy absorption state as a result of fluctuations between lateral force of the seismic event being imparted in the first direction 254 and the second direction 256.

In some embodiments, the first damper assembly and the second damper assembly are comprised in a same damper assembly configured to mitigate lateral displacement of the equipment support structure during a seismic event.

Figure 4:
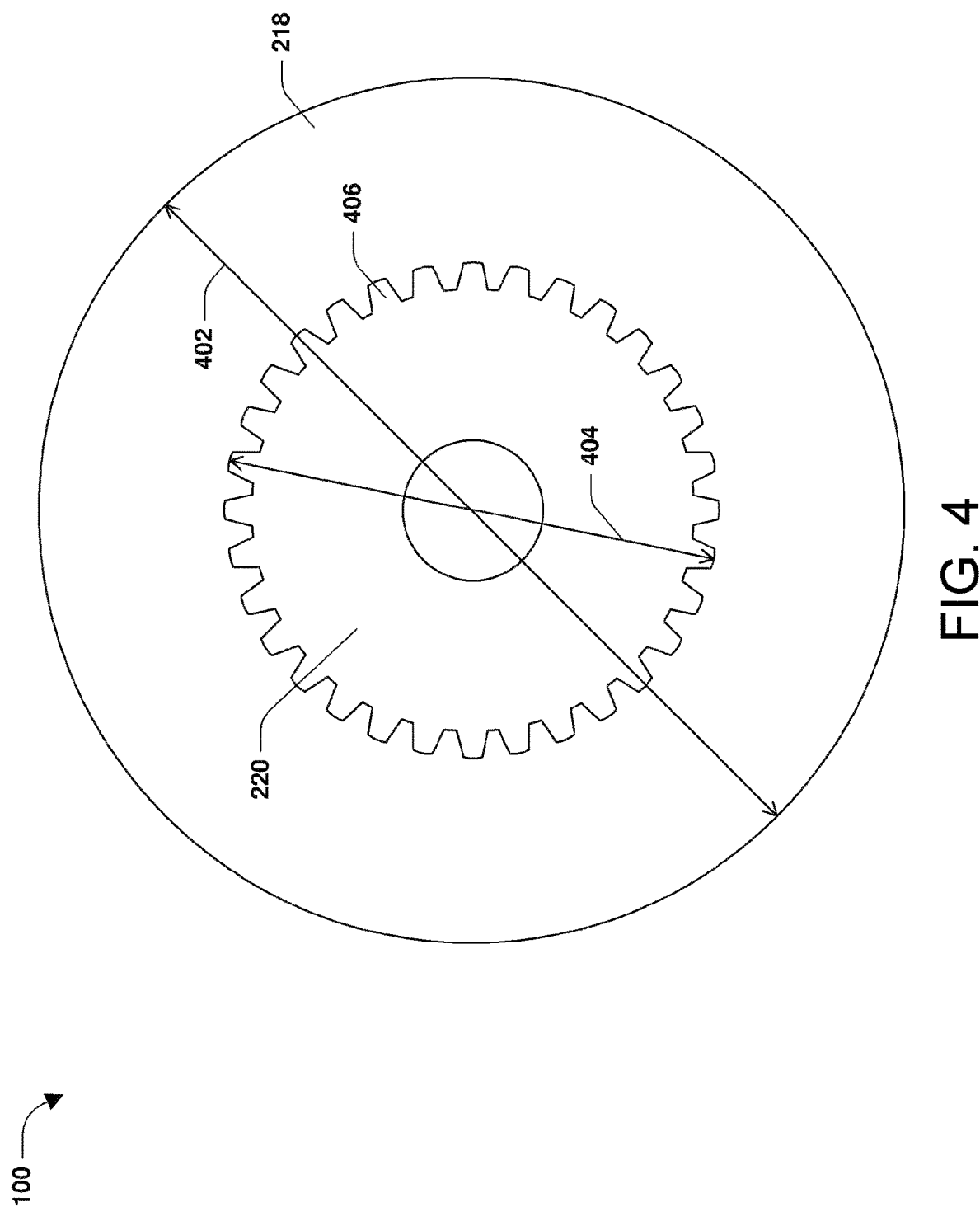
FIG. 4 illustrates a top view of a first gear and a first mass damper flywheel, in accordance with some embodiments.

FIG. 4 illustrates a top view of the first gear 220 and the first mass damper flywheel 218, according to some embodiments. In some embodiments, the first gear 220 comprises a plurality of gear teeth comprises a first gear tooth 406. A quantity of gear teeth of the plurality of gear teeth is at least 20. Other values of the quantity of gear teeth are within the scope of the present disclosure. In some embodiments, the first gear 220 has a first gear diameter 404. In some embodiments, the first mass damper flywheel 218 has a first mass damper flywheel diameter 402. In some embodiments, the first gear diameter 404 is less than the first mass damper flywheel diameter 402. The first mass damper flywheel diameter 402 is between about 6 centimeters and about 30 centimeters. Other values of the first mass damper flywheel diameter 402 are within the scope of the present disclosure. In some embodiments, the first mass damper flywheel 218 has a first mass damper flywheel weight. In some embodiments, the first mass damper flywheel weight of the first mass damper flywheel 218 is between about a first weight and about a second weight. The first weight is equal to about 5 kilograms. Other values of the first weight is within the scope of the present disclosure. In some embodiments, the second weight is based upon a component weight of the component 102. In some embodiments, the second weight is equal to the component weight divided by a value, such as 10 or other value. In some embodiments, at least one of the first mass damper flywheel diameter 402 or the first mass damper flywheel weight is determined and/or tuned based upon one or more characteristics of the component 102 comprising at least one of the component weight, a size of the component 102, or one or more other characteristics.

In some embodiments, the second gear 228 has one or more of the features, characteristics, sizes, dimensions, metrics, relationships with other elements, etc. provided herein with respect to the first gear 220. In some embodiments, the second mass damper flywheel 226 has one or more of the features, characteristics, sizes, dimensions, metrics, relationships with other elements, etc. provided herein with respect to the first mass damper flywheel 218.

In some embodiments, the gear rack 240 is vertically displaced relative to at least one of the first gear 220 or the second gear 228 during the seismic event, such as due, at least in part, to the first damper assembly converting lateral force of the seismic event to vertical movement of the equipment support structure to which the gear rack 240 is coupled. In some embodiments, the gear rack 240 is designed to stay meshed with at least one of the first gear 220 or the second gear 228 during the seismic event. In some embodiments, a height 244 of each gear rack tooth of one, some and/or all gear rack teeth of the gear rack 240 is at least a first threshold height. In some embodiments, the first threshold height is greater than an extent to which the gear rack 240 is vertically displaced during the seismic event relative to at least one of the first gear 220 or the second gear 228. In some embodiments, at least one of the first gear 220 or the second gear 228 remain meshed with gear rack teeth of the gear rack 240 during the seismic event, such as due, at least in part, to the height 244 being at least the first threshold height. In some embodiments, vertical displacement of the gear rack 240 during the seismic event does not cause the first gear or the second gear to become unmeshed from the gear rack 240, such as due, at least in part, to the height 244 being at least the first threshold height.

Figure 5:
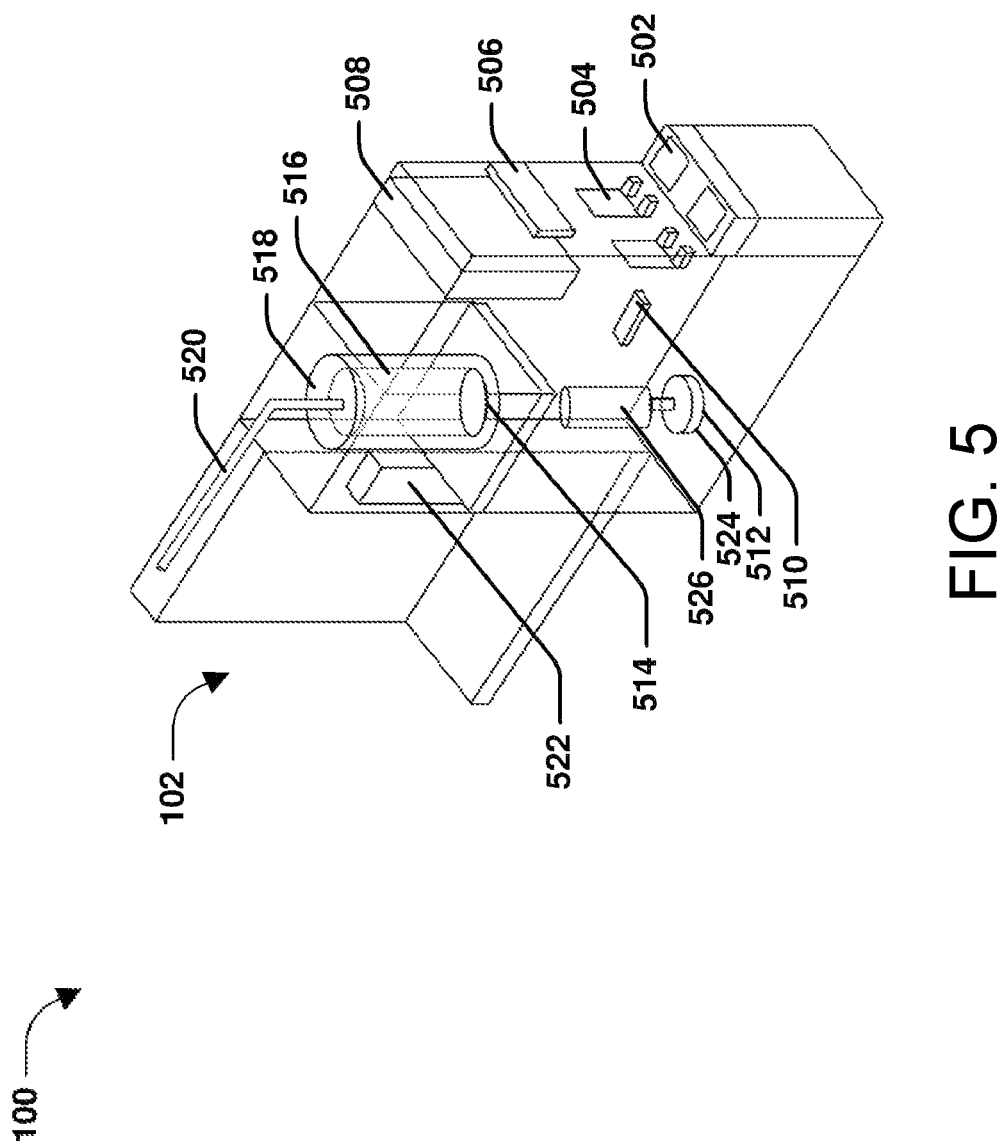
FIG. 5 illustrates a perspective view of a component, in accordance with some embodiments.

FIG. 5 illustrates a perspective view of the component 102, according to some embodiments. The component 102 comprises a semiconductor furnace tool. Other structures, functions, configurations, etc. of the component 102 are within the scope of the present disclosure. In some embodiments, the component 102 comprises at least one of a load port 502, an interface port 504, a carrier transfer component 506, a stage 508, a wafer transfer component 510, a boat elevator 512, a floor box 514, a reactor 516, a heat chamber 518, a gas exhaust 520, a gas unit 522, a boat module 524, a boat 526, or one or more other components. In some embodiments, the interface port 504 comprises a front-opening interface mechanical standard (FIMS) port.

Figure 6:
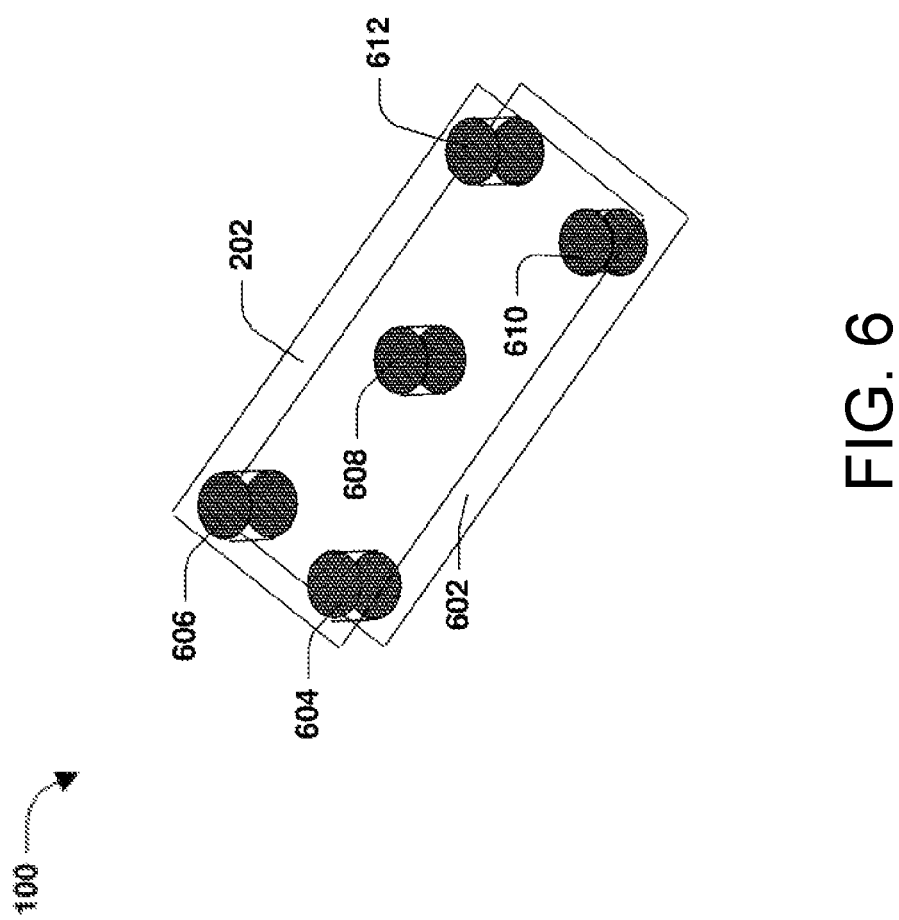
FIG. 6 illustrates a perspective view of a first plate overlying a first foundation, in accordance with some embodiments.

FIG. 6 illustrates a perspective view of the first plate 202 overlying a first foundation 602, according to some embodiments. In some embodiments, the surface 106 is a surface, such as a top surface, of at the first foundation 602. In some embodiments, the first foundation 602 comprises a foundation member of the building in which the component 102 and the damper apparatus 104 are disposed. In some embodiments, the first foundation 602 at least one of overlies or is in contact with the ground. In some embodiments, a plurality of damper structures is disposed between the foundation and the first plate 202. In some embodiments, the plurality of damper structures comprises at least one of a first damper structure 604, a second damper structure 606, a third damper structure 608, a fourth damper structure 610, or a fifth damper structure 612. In some embodiments, each damper structure of one, some or all damper structures of the plurality of damper structures comprises one or more of the features, characteristics, sizes, dimensions, metrics, relationships with other elements, etc. provided herein with respect to the damper apparatus 104. In some embodiments, each damper structure of one, some or all damper structures of the plurality of damper structures comprises at least one of a flywheel assembly, a damper body, a gear rack, or a base plate. In some embodiments, each damper structure of one, some or all damper structures of the plurality of damper structures comprises at least one of the first damper assembly or the second damper assembly.

In some embodiments, the component 102 is used to process one or more wafers, such as one or more semiconductor wafers. In some embodiments, the damper apparatus 104 at least one of mitigates or prevents damage and/or particle defects caused by the seismic event.

Other arrangements, configurations, structures, interrelationships, positions, connections, etc. of the second damper assembly other than those shown and/or described herein are within the scope of the present disclosure.

Embodiments are contemplated in which at least one of the equipment support structure, the gear rack 240, the first flywheel assembly 266, or the second flywheel assembly 268 is arranged, positioned, etc. differently than shown in and/or described herein. Embodiments are contemplated in which the gear rack 240 is attached to an object different than the body 204 of the equipment support structure, such as attached to at least one of the first plate 202, the second plate 206, or other object.

In some embodiments, an apparatus is provided. The apparatus includes an equipment support structure configured to support a semiconductor fabrication component. The apparatus includes a damper assembly configured to convert a lateral force induced by a seismic event to a vertical movement of the equipment support structure. The damper assembly includes a base plate underlying the equipment support structure, a first damper body between the equipment support structure and the base plate, and a second damper body between the equipment support structure and the base plate. The first damper body and the second damper body are in contact with a first surface of the base plate. The first surface of the base plate is curved such that interaction between the first damper body and the second damper body with the first surface of the base plate translates the lateral force induced by the seismic event to the vertical movement of the equipment support structure.

In some embodiments, an apparatus is provided. The apparatus includes an equipment support structure configured to support a semiconductor fabrication component. The apparatus includes a damper assembly configured to resist a lateral force induced by a seismic event to the equipment support structure. The damper assembly includes a gear rack coupled to the equipment support structure. The damper assembly includes a first flywheel assembly including a first mass damper flywheel and a first gear meshed with the gear rack and selectively engaged with the first mass damper flywheel.

In some embodiments, an apparatus is provided. The apparatus includes an equipment support structure configured to support a semiconductor fabrication component. The apparatus includes a damper assembly configured to mitigate lateral displacement of the equipment support structure during a seismic event. The damper assembly includes a gear rack coupled to the equipment support structure. The damper assembly includes a first flywheel assembly including a first mass damper flywheel. The damper assembly includes a first gear meshed with the gear rack and selectively engaged with the first mass damper flywheel. The damper assembly includes a base plate underlying the equipment support structure. The damper assembly includes a first damper body between the equipment support structure and the base plate. The damper assembly includes a second damper body between the equipment support structure and the base plate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" and/or the like is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus, comprising:
   an equipment support structure configured to support a semiconductor fabrication component, wherein the equipment support structure comprises a first plate; and
   a damper assembly configured to convert a lateral force induced by a seismic event to a vertical movement of the equipment support structure, wherein:
     the damper assembly comprises:
       a base plate underlying the equipment support structure;
       a first damper body between the equipment support structure and the base plate; and
       a second damper body between the first plate and the base plate;
     the first damper body and the second damper body are in contact with a first surface of the base plate and a first surface of the first plate;
     the first surface of the first plate is planar; and
     the first surface of the base plate is curved such that interaction between the first damper body and the second damper body with the first surface of the base plate translates the lateral force induced by the seismic event to the vertical movement of the equipment support structure.

2. The apparatus of claim 1, wherein:
   the first surface of the base plate extends from a first edge of the base plate to a second edge of the base plate;
   the first edge has a first elevation relative to a second surface underlying the base plate;
   the second edge has a second elevation relative to the second surface;
   a portion, of the first surface, between the first edge and the second edge has a third elevation relative to the second surface; and
   the first elevation and the second elevation are greater than the third elevation.

3. The apparatus of claim 1, wherein:
   the first damper body comprises a first cylindrical object; and
   the second damper body comprises a second cylindrical object.

4. The apparatus of claim 1, wherein:
   the first damper body comprises a first metal; and
   the second damper body comprises a second metal.

5. The apparatus of claim 1, wherein:
   the first damper body has a first circular cross-section; and
   the second damper body has a second circular cross-section.

6. An apparatus, comprising:
   an equipment support structure configured to support a semiconductor fabrication component, wherein the equipment support structure comprises:
     a first plate;
     a second plate; and
     a body extending between the first plate and the second plate and fixedly coupled to the first plate and the second plate; and
   a damper assembly configured to resist a lateral force induced by a seismic event to the equipment support structure, wherein the damper assembly comprises:
     a gear rack coupled to the body of the equipment support structure; and
     a first flywheel assembly comprising:
       a first mass damper flywheel; and
       a first gear meshed with the gear rack and selectively engaged with the first mass damper flywheel;
     a base plate underlying the first plate and the second plate; and
     a first damper body between the first plate and the base plate, wherein:
       the first damper body is in contact with a first surface of the base plate and a first surface of the first plate, and
       the first surface of the first plate is planar.

7. The apparatus of claim 6, wherein the first flywheel assembly comprises:
   a first one-way bearing configured to:
     facilitate engagement of the first gear with the first mass damper flywheel when the lateral force induced by the seismic event is in a first direction to allow movement of the first mass damper flywheel in a first rotational direction; and
     facilitate disengagement of the first gear from the first mass damper flywheel when the lateral force induced by the seismic event is in a second direction.

8. The apparatus of claim 7, wherein the damper assembly comprises:
   a second flywheel assembly comprising:
     a second mass damper flywheel;
     a second gear meshed with the gear rack and selectively engaged with the second mass damper flywheel; and
     a second one-way bearing configured to:
       facilitate engagement of the second gear with the second mass damper flywheel when the lateral force induced by the seismic event is in the second direction to facilitate movement of the second mass damper flywheel in a second rotational direction; and
       facilitate disengagement of the second gear from the second mass damper flywheel when the lateral force induced by the seismic event is in the first direction.

9. The apparatus of claim 6, wherein:
   the first gear comprises at least 20 teeth.

10. The apparatus of claim 6, wherein:
    the first gear has a first gear diameter;
    the first mass damper flywheel has a first mass damper flywheel diameter; and
    the first gear diameter is less than the first mass damper flywheel diameter.

11. An apparatus, comprising:
    an equipment support structure configured to support a semiconductor fabrication component; and
    a damper assembly configured to mitigate lateral displacement of the equipment support structure during a seismic event, wherein:
      the damper assembly comprises:
        a gear rack coupled to the equipment support structure; and
        a first flywheel assembly comprising:
          a first mass damper flywheel; and
          a first gear meshed with the gear rack and selectively engaged with the first mass damper flywheel;
        a base plate underlying the equipment support structure;

a first damper body between the equipment support structure and the base plate; and a second damper body between the equipment support structure and the base plate, wherein:

the first damper body and the second damper body are in contact with a first surface of the base plate, and a thickness of the base plate, measured from the first surface to a second surface of the base plate diametrically opposite the first surface of the base plate, is smallest at a lateral midpoint of the base plate.

12. The apparatus of claim 11, wherein the equipment support structure comprises:
a first plate;
a second plate underlying the first plate; and
a body between the first plate and the second plate.

13. The apparatus of claim 12, wherein:
the first plate is in contact with the semiconductor fabrication component.

14. The apparatus of claim 12, wherein:
the second plate is in contact with the first damper body and the second damper body.

15. The apparatus of claim 12, wherein:
the gear rack is coupled to the body of the equipment support structure.

16. The apparatus of claim 11, wherein the first flywheel assembly comprises:
a first one-way bearing configured to:
facilitate engagement of the first gear with the first mass damper flywheel when a lateral force induced by the seismic event is in a first direction to allow movement of the first mass damper flywheel in a first rotational direction; and
facilitate disengagement of the first gear from the first mass damper flywheel when the lateral force induced by the seismic event is in a second direction.

17. The apparatus of claim 16, wherein the damper assembly comprises:
a second flywheel assembly comprising:
a second mass damper flywheel;
a second gear meshed with the gear rack and selectively engaged with the second mass damper flywheel; and
a second one-way bearing configured to:
facilitate engagement of the second gear with the second mass damper flywheel when the lateral force induced by the seismic event is in the second direction to facilitate movement of the second mass damper flywheel in a second rotational direction; and
facilitate disengagement of the second gear from the second mass damper flywheel when the lateral force induced by the seismic event is in the first direction.

18. The apparatus of claim 11, wherein:
the first surface of the base plate is curved such that the base plate has a continuously varying slope from the lateral midpoint to a first end of the base plate.

19. The apparatus of claim 11, wherein:
the first damper body comprises a first cylindrical object; and
the second damper body comprises a second cylindrical object.

20. The apparatus of claim 11, wherein:
the first damper body has a first circular cross-section; and
the second damper body has a second circular cross-section.

* * * * *